(12) United States Patent
Washio et al.

(10) Patent No.: US 9,732,223 B2
(45) Date of Patent: Aug. 15, 2017

(54) SEMI-AROMATIC POLYAMIDE RESIN COMPOSITION AND MOLDED ARTICLE CONTAINING SAME

(71) Applicant: MITSUI CHEMICALS, INC., Minato-ku, Tokyo (JP)

(72) Inventors: Isao Washio, Chiba (JP); Hiroki Ebata, Yokohama (JP); Hideto Ogasawara, Sodegaura (JP); Nobuhiro Takizawa, Kamakura (JP); Fumio Kageyama, Ichihara (JP); Akinori Amano, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/906,990

(22) PCT Filed: Jul. 25, 2014

(86) PCT No.: PCT/JP2014/003943
§ 371 (c)(1),
(2) Date: Jan. 22, 2016

(87) PCT Pub. No.: WO2015/011935
PCT Pub. Date: Jan. 29, 2015

(65) Prior Publication Data
US 2016/0168381 A1    Jun. 16, 2016

(30) Foreign Application Priority Data
Jul. 26, 2013    (JP) .................................. 2013-155562

(51) Int. Cl.
| C08L 77/00 | (2006.01) |
| H01B 1/24 | (2006.01) |
| C08L 77/06 | (2006.01) |
| C08L 23/26 | (2006.01) |
| C08G 69/26 | (2006.01) |

(52) U.S. Cl.
CPC ............ *C08L 77/06* (2013.01); *C08G 69/265* (2013.01); *C08L 23/26* (2013.01); *H01B 1/24* (2013.01)

(58) Field of Classification Search
CPC ............ C08L 77/06; C08L 23/26; H01B 1/24
USPC .................................................. 252/500, 511
See application file for complete search history.

(56) References Cited

U.S. PATENT DOCUMENTS

| 5,405,904 A | 4/1995 | Ikejiri et al. |
| 5,591,382 A | 1/1997 | Nahass et al. |
| 6,136,915 A | 10/2000 | Ohara et al. |
| 2002/0173584 A1* | 11/2002 | Ebert ...................... C08L 77/00 524/538 |
| 2003/0116757 A1 | 6/2003 | Miyoshi et al. |
| 2003/0134980 A1 | 7/2003 | Hayashi et al. |
| 2006/0062715 A1 | 3/2006 | Endo et al. |
| 2006/0270799 A1 | 11/2006 | Sato et al. |
| 2009/0098325 A1 | 4/2009 | Uchida et al. |
| 2011/0123749 A1* | 5/2011 | Hewel .................. C08G 69/265 428/36.9 |
| 2013/0295308 A1 | 11/2013 | Kumazawa et al. |

FOREIGN PATENT DOCUMENTS

| JP | 06-119949 A | 4/1994 |
| JP | 07-090178 A | 4/1995 |
| JP | 11-222553 A | 8/1999 |
| JP | 2000-129122 A | 5/2000 |
| JP | 2002-294071 A | 10/2002 |
| JP | 3761561 | 3/2006 |
| JP | 2006-213798 A | 8/2006 |
| JP | 2007-177208 A | 7/2007 |
| JP | 2008-179753 A | 8/2008 |
| JP | 2013-067705 A | 4/2013 |
| WO | WO 94/23433 A | 10/1994 |
| WO | WO 01/81473 A | 11/2001 |
| WO | WO 03/085029 A | 10/2003 |
| WO | WO 2012/098840 A | 7/2012 |

OTHER PUBLICATIONS

International Search Report (PCT/ISA/210) issued on Oct. 14, 2014, by the Japanese Patent Office as the International Searching Authority for International Application No. PCT/JP2014/003943.
Written Opinion (PCT/ISA/237) issued on Oct. 14, 2014, by the Japanese Patent Office as the International Searching Authority for International Application No. PCT/JP2014/003943.
Extended European Search Report issued by the European Patent Office on Feb. 24, 2017, in corresponding European Patent Application No. 14828822.8, (7 pages).
Fan, X. et al., "Engineering plastic and Application Thereof", First Print, First Edition, Apr. 2006, p. 114, with an English translation (4 pages).

* cited by examiner

*Primary Examiner* — Harold Pyon
*Assistant Examiner* — Danny N Kang
(74) *Attorney, Agent, or Firm* — Buchanan, Ingersoll & Rooney PC

(57) ABSTRACT

The present invention provides a semi-aromatic polyamide resin composition having exceptional impact resistance, fuel barrier properties, and injection moldability, as well as a molded article containing the same, through a semi-aromatic polyamide resin composition containing specific proportions of (A) a semi-aromatic polyamide comprising a dicarboxylic acid component comprising terephthalic acid and adipic acid and a diamine component having a linear aliphatic diamine having 4-10 carbon atoms, (B) a semi-aromatic polyamide comprising a dicarboxylic acid component having isophthalic acid and a diamine component having an aliphatic diamine having 4-15 carbon atoms, (C) an olefin polymer containing a specific amount of functional group structural units, and (D) a fibrous filler.

13 Claims, No Drawings

SEMI-AROMATIC POLYAMIDE RESIN COMPOSITION AND MOLDED ARTICLE CONTAINING SAME

TECHNICAL FIELD

The present invention relates to a semi-aromatic polyamide resin composition and a molded product containing the same.

BACKGROUND ART

A polyamide typically represented by nylon 6 or nylon 66 is excellent in moldability, mechanical properties and chemical resistance, and widely used as a material for various components of automobiles, industrial materials, clothing, and electric, electronic or industrial applications. In recent years, drastic reduction in the amount of evaporated automobile fuel has been required mainly in the United States. Accordingly, there is a demand for drastic reduction in the amount of fuel evaporation from fuel system parts such as fuel tubes and fuel tube joints.

The joints are also required to have a high impact resistance to prevent damage from an impact caused by a flying stone or an accident.

To satisfy such requirements, a fuel pipe joint using PA9T having excellent fuel barrier properties has been proposed. PTL 1 discloses a polyamide resin composition containing a specific PA9T, a maleic anhydride-modified ethylene-butene copolymer as a modified olefin polymer, and glass fiber.

CITATION LIST

Patent Literature

PTL 1
Japanese Patent Application Laid-Open No. 2008-179753

SUMMARY OF INVENTION

Technical Problem

PA9T used in the resin composition disclosed in PTL 1 contains 2-methyl-1,8-octanediamine as a diamine component in addition to 1,9-nonanediamine. This causes impaired crystallinity, and reduced crystallization rate, and in some cases, insufficient moldability such as the mold releasability in injection molding.

Further, PA9T has a problem such that toughness, e.g., impact resistance of a molded product, is lower than that of an aliphatic polyamide such as a conventional nylon 12. PTL 1 improves the impact resistance strength by blending a modified olefin polymer with the resin composition. However, the present inventors have found that the resin composition has poor moldability in some cases, with insufficient mold releasability or increased viscosity to lower injection flowability.

An object of the present invention is to provide a semi-aromatic polyamide resin composition excellent in impact resistance, fuel barrier properties, and moldability, and a molded product containing the same.

Solution to Problem

The present invention relates to semi-aromatic polyamide resin compositions as set forth below.

[1] A semi-aromatic polyamide resin composition containing:
   20 to 60 parts by mass of a semi-aromatic polyamide (A) having a melting point (Tm) of 290° C. or higher and 340° C. or lower, measured with a differential scanning calorimeter (DSC);
   5 to 30 parts by mass of a semi-aromatic polyamide (B) having a heat of melting ($\Delta$H) of 0 J/g or more and 5 J/g or less in a temperature rising process (temperature rising rate: 10° C./min) of the differential scanning calorimeter (DSC);
   1 to 30 parts by mass of an olefin polymer (C) comprising 0.1 to 1.5 parts by mass of a structural unit having a hetero atom-containing functional group; and
   0 to 60 parts by mass of a fibrous filler (D);
   wherein the total of (A), (B), (C) and (D) is 100 parts by mass.

[2] The semi-aromatic polyamide resin composition according to [1], wherein the semi-aromatic polyamide (A) contains as dicarboxylic acid components, a structural unit derived from terephthalic acid and a structural unit derived from adipic acid, and as a diamine component, a structural unit derived from a straight chain aliphatic group having 4 to 10 carbon atoms.

[3] The semi-aromatic polyamide resin composition according to [2], wherein a molar ratio of the structural unit derived from terephthalic acid to the structural unit derived from adipic acid contained in the semi-aromatic polyamide (A) is 40/60 to 80/20.

[4] The semi-aromatic polyamide resin composition according to any one of [1] to [3], wherein the semi-aromatic polyamide (B) contains as a dicarboxylic acid component, a structural unit derived from isophthalic acid, and as a diamine component, a structural unit derived from an aliphatic group having 4 to 15 carbon atoms.

[5] The semi-aromatic polyamide resin composition according to [4], wherein the semi-aromatic polyamide (B) may further contain a structural unit derived from terephthalic acid, and a molar ratio of the structural unit derived from isophthalic acid to the structural unit derived from terephthalic acid is 60/40 to 100/0.

[6] The semi-aromatic polyamide resin composition according to any one of [1] to [5], wherein the semi-aromatic polyamide (A) and the semi-aromatic polyamide (B) fulfills the relationship (B)/((A)+(B)) of 0.05 to 0.5, the (A) being the mass of the semi-aromatic polyamide (A), and the (B) being the mass of the semi-aromatic polyamide (B).

[7] The semi-aromatic polyamide resin composition according to any one of [1] to [6], wherein 80 to 100 mol % of the total diamine components contained in the semi-aromatic polyamide (A) is a structural unit derived from 1,6-hexanediamine.

[8] The semi-aromatic polyamide resin composition according to any one of [1] to [7], wherein 40 to 100 mol % of the total diamine components contained in the semi-aromatic polyamide (B) is a structural unit derived from 1,6-hexanediamine.

[9] The semi-aromatic polyamide resin composition according to any one of [1] to [8], wherein the olefin polymer (C) contains a skeleton derived from a polyolefin, and the skeleton is a copolymer of ethylene and an olefin having 3 or more carbon atoms.

[10] The semi-aromatic polyamide resin composition according to any one of [1] to [9], wherein: the structural unit having a hetero atom-containing functional group of the olefin polymer (C) comprises a functional group selected from the group consisting of a carboxylic acid group, an ester group, an ether group, an aldehyde group, and a ketone group.

[11] The semi-aromatic polyamide resin composition according to any one of [1] to [10], wherein the structural unit having a hetero atom-containing functional group of the olefin polymer (C) is a structural unit modified by maleic anhydride.

[12] The semi-aromatic polyamide resin composition according to any one of [1] to [11], further containing a conductive material (E).

[13] The semi-aromatic polyamide resin composition according to [12], wherein the conductive material (E) is at least one member selected from the group consisting of carbon fiber, conductive carbon black, carbon fibril and carbon nanotube.

[14] A molded product including the semi-aromatic polyamide resin composition according to any one of [1] to [13].

[15] The molded product according to [14], for use as a quick connector.

Advantageous Effects of Invention

The present invention provides a semi-aromatic polyamide resin composition excellent in impact resistance, fuel barrier properties, and moldability, and a molded product containing the same, for example, a quick connector.

DESCRIPTION OF EMBODIMENTS

In the present specification and the appended claims, any range using the term "to" means a range including the boundary values as well as intermediate values. For example, the range "A to B" means a range including "A," "B," and "intermediate values between A and B."

1. Semi-Aromatic Polyamide Resin Composition

The semi-aromatic polyamide resin composition of the present invention includes a semi-aromatic polyamide (A), a semi-aromatic polyamide (B), and an olefin polymer (C), and preferably further includes a fibrous filler (D) and a conductive material (E).

The present inventors have found that, the semi-aromatic polyamide resin composition of the present invention achieves both high gas barrier properties and good moldability by blending a semi-aromatic polyamide (B) with low crystallinity but excellent gas barrier properties with a semi-aromatic polyamide (A). Although the reason is not clear, it can be deduced as follows. In the blend of the semi-aromatic polyamide (B) and the semi-aromatic polyamide (A), as apparent from the component ratio described below, the semi-aromatic polyamide (A) forms a major phase and the semi-aromatic polyamide (B) is finely dispersed therein, and the blend maintains both the excellent moldability of the semi-aromatic polyamide (A) and the excellent effect of the semi-aromatic polyamide (B) for improving gas barrier properties.

In order to prevent the thermal decomposition of polymers and various additive materials during melt polymerization and melt molding, the semi-aromatic polyamide resin composition of the present invention has a melting point of preferably 280° C. to 330° C.

1-1. Semi-Aromatic Polyamide (A)

The semi-aromatic polyamide (A) is a semi-aromatic polyamide having a melting point (Tm) of 290° C. or higher but not higher than 340° C., as measured by differential scanning calorimetry (hereinafter referred to as DSC). More preferably, the semi-aromatic polyamide has a melting point of 290° C. or higher but not higher than 330° C. The melting point of the semi-aromatic polyamide (A) of 290° C. or higher can improve the heat resistance and the mechanical strength of a semi-aromatic polyamide resin composition. The melting point of the semi-aromatic polyamide (A) of 340° C. or lower keeps the melting point of the semi-aromatic polyamide resin composition from being excessively high, thereby preventing the thermal decomposition of polymers and various additive materials during the melt polymerization and melt molding.

The semi-aromatic polyamide (A) is not particularly limited as long as the polyamide has an aromatic group. For example, the semi-aromatic polyamide may be a polyamide having a dicarboxylic acid component, such as a structural unit derived from terephthalic acid or isophthalic acid, and a diamine component, or a polyamide having a structural unit derived from a diamine having an aromatic group such as m-xylylenediamine.

The melting point of the semi-aromatic polyamide (A) can be controlled within the above-mentioned range by adjusting the composition or the like. For example, in the case of a polyamide having respective structural units derived from terephthalic acid, adipic acid and 1,6-hexanediamine, the melting point may be controlled to fall within the above-mentioned range by adjusting the molar ratio of the structural unit derived from terephthalic acid to the structural unit derived from adipic acid to be in the range of 40/60 to 80/20. In the case of a polyamide having respective structural units derived from terephthalic acid, 1,9-nonanediamine, and 2-methyl-1,8-octanediamine, the melting point may be controlled to fall within the above-mentioned range by adjusting the molar ratio of the structural unit derived from 1,9-nonanediamine to the structural unit derived from 2-methyl-1,8-octanediamine to be in the range of 70/30 to 90/10. In the case of a polyamide having respective structural units derived from terephthalic acid, 1,6-hexanediamine, and 2-methyl-1,5-pentanediamine, the melting point may be controlled to fall within the above-mentioned range by adjusting the molar ratio of the structural unit derived from 1,6-hexanediamine to the structural unit derived from 2-methyl-1,5-pentanediamine to be in the range of 40/60 to 70/30. In the case of a polyamide having respective structural units derived from terephthalic acid, isophthalic acid, and 1,6-hexanediamine, the melting point may be controlled to fall within the range by adjusting the molar ratio of the structural unit derived from terephthalic acid to the structural unit derived from isophthalic acid to be in the range of 70/30 to 50/50.

Each of the structural units contained in the semi-aromatic polyamide (A) and the proportions thereof can be identified from the feed ratio used for manufacturing the semi-aromatic polyamide (A), or by known means such as $^{13}$C-NMR measurement or $^1$H-NMR measurement.

The present invention may employ, for example, a semi-aromatic polyamide having a dicarboxylic acid component containing a structural unit derived from terephthalic acid and a structural unit derived from adipic acid and a diamine component (hereinafter, referred to as a semi-aromatic polyamide (A')).

The semi-aromatic polyamide (A') has excellent moldability, by virtue of the structural unit derived from terephthalic acid and the structural unit derived from adipic acid which are both used as dicarboxylic acid components. Further, the resultant polyamide resin composition has excellent gas barrier properties in comparison with an aliphatic polyamide. Though not clear, the reason can be deduced as follows.

Generally, a semi-aromatic polyamide using, such as PA6T or PA9T, which uses terephthalic acid has excellent gas barrier properties in comparison with an aliphatic polyamide by virtue of its aromatic group. However, in some cases, use of PA6T or PA9T as a homopolymer may cause the thermal decomposition of polymers and various additive materials during melt polymerization and melt molding due to its excessively high melting point. In practical use, the semi-aromatic polyamide is, therefore, copolymerized with a dicarboxylic acid component such as adipic acid or isophthalic acid, or with an aliphatic diamine such as 2-ethyl-1,5-pentanediamine, so as to lower the melting point to about 280° C. to 330° C. For example, the melting point of PA9T described in PTL1 is lowered by copolymerization with 2-methyl-1,8-octanediamine. However, when the semi-aromatic polyamide is a compound having a structural unit derived from a compound having a 2-methyl-1,8-octanediamine side chain or the like, crystallinity of the semi-aromatic polyamide may be impaired due to an increase in the flexibility of the polyamide chain.

On the other hand, the semi-aromatic polyamide (A') contains a copolymer of adipic acid and terephthalic acid as a dicarboxylic acid, and therefore, the resultant polymer has high linearity. Furthermore, the semi-aromatic polyamide (A') is a copolymer with an isomorphous substitution in which the length of the structural units in the molecular chain direction are similar for those derived from terephthalic acid and those derived from adipic acid. Both of these features enhance crystallinity, so that the semi-aromatic polyamide (A') can have a low melting point without impairing high crystallinity inherent to the polyamide made using terephthalic acid. It is conceivable that a polyamide resin composition excellent in moldability such as mold releasability can be obtained by virtue of the above-mentioned features.

The molar ratio of the structural unit derived from terephthalic acid to the structural unit derived from adipic acid contained in the semi-aromatic polyamide (A') is preferably 40/60 to 80/20, more preferably 40/60 to 70/30, further preferably 50/50 to 70/30, furthermore preferably 60/40 to 70/30. With the molar ratio of the structural unit derived from terephthalic acid to the structural unit derived from adipic acid in this range, the polyamide resin composition has sufficient heat resistance and chemical resistance. With the molar ratio in this range, the molding temperature in injection molding is lowered, so that the amount of gas generated in molding due to the decomposition of an olefin polymer (C) and the like can be reduced. Consequently, excellent moldability can be achieved with reduced mold stains, for example, by gas burn.

The semi-aromatic polyamide (A') may have a dicarboxylic acid component derived from an acid other than terephthalic acid or adipic acid. Note that the number of moles of the dicarboxylic acid component derived from an acid other than terephthalic acid or adipic acid which are contained in the semi-aromatic polyamide (A') is preferably 5% or less relative to the total number of moles of the structural unit derived from terephthalic acid and the structural unit derived from adipic acid. Examples of the dicarboxylic acids derived from an acid other than terephthalic acid or adipic acid which are contained in the semi-aromatic polyamide (A') include: aromatic dicarboxylic acids such as isophthalic acid, 2-methylterephthalic acid, and naphthalenedicarboxylic acid; furandicarboxylic acids such as 2,5-furandicarboxylic acid; alicyclic dicarboxylic acids such as 1,4-cyclohexanedicarboxylic acid and 1,3-cyclohexanedicarboxylic acid; aliphatic dicarboxylic acids such as malonic acid, dimethylmalonic acid, succinic acid, glutaric acid, 2-methyladipic acid, trimethyladipic acid, pimelic acid, 2,2-dimethylglutaric acid, 3,3-diethylsuccinic acid, azelaic acid, sebacic acid and suberic acid; aliphatic dicarboxylic acids having 11 or more carbon atoms; and structural units derived from any mixture thereof.

Preferably the diamine component constituting the semi-aromatic polyamide (A') is a component derived from a straight chain aliphatic diamine having 4 to 10 carbon atoms. This is because a highly crystalline semi-aromatic polyamide having low water absorption and high heat resistance can be obtained by the single use of a straight chain aliphatic diamine fulfilling this range. Preferably 80 to 100 mol % of the total diamine components constituting the semi-aromatic polyamide (A') is a component derived from a straight chain aliphatic diamine having 4 to 10 carbon atoms.

Examples of the straight chain aliphatic diamine having 4 to 10 carbon atoms include 1,4-butanediamine, 1,6-hexanediamine, 1,7-heptanediamine, 1,8-octanediamine, 1,9-nonanediamine and 1,10-decanediamine. These may be used individually or in a mixture thereof. The diamine component constituting the semi-aromatic polyamide (A') is preferably a component derived from 1,6-hexanediamine. Preferably 80 to 100 mol % and more preferably 90 to 100 mol % of the total diamine components constituting the semi-aromatic polyamide (A') is the component derived from 1,6-hexanediamine.

The semi-aromatic polyamide (A') may have a diamine component other than the aliphatic diamine having 4 to 10 carbon atoms. Preferably the number of moles of the diamine other than the diamine described above is 5% or less relative to the total diamine components contained in the semi-aromatic polyamide (A'). Examples of the diamine other than the diamine described above include straight chain aliphatic diamines having 11 or more carbon atoms such as 1,11-decanediamine and 1,12-dodecanediamine; chain aliphatic diamines having a side chain such as 2-methyl-1,5-pentanediamine, 2-methyl-1,6-hexanediamine, 2-methyl-1,7-heptanediamine, 2-methyl-1,8-octanediamine, 2-methyl-1,9-nonanediamine, 2-methyl-1,10-decanediamine and 2-methyl-1,11-undecanediamine; aromatic diamines such as meta-xylenediamine; and alicyclic diamines such as 1,4-cyclohexanediamine and 1,3-cyclohexanediamine.

The intrinsic viscosity [η] of the semi-aromatic polyamide (A) is preferably 0.7 to 1.6 dl/g, more preferably 0.8 to 1.2 dl/g. The intrinsic viscosity [η] is measured in 96.5% sulfuric acid at 25° C. With an intrinsic viscosity [η] in this range, it becomes possible to enhance the flowability of the resin composition during molding, and the resultant molded product can have improved mechanical properties.

The terminal amino group content of the semi-aromatic polyamide (A) is preferably 10 to 400μ equivalent, more preferably 50 to 400μ equivalent, furthermore preferably 100 to 400μ equivalent. The presence of a terminal amino group in an amount of 10μ equivalent or more enables the compatibility with an olefin polymer (C) and the strength at a resin interface to be increased, and the adhesiveness with a fibrous filler (D) and a conductive material (E) to be enhanced, and as a result, the mechanical properties such as impact resistance tend to be improved. A terminal amino group in an amount of 400μ equivalent or lower tends to suppress water absorption at a low level and achieve and excellent long-term heat resistance.

The amount of the terminal amino group [NH$_2$] of the semi-aromatic polyamide (A) is measured by the following method. The semi-aromatic polyamide (A) in an amount of 0.5 to 0.7 g is precisely weighed, and dissolved in 30 mL of m-cresol. To the resultant are added 1 to 2 drops of 0.1% thymol blue/m-cresol solution as an indicator, thereby preparing a sample solution. The sample solution is titrated with 0.02-N p-toluenesulfonic acid solution until the color changes from yellow to blue violet to thereby measure the terminal amino group content ([NH$_2$], unit: µ equivalent/g).

The semi-aromatic polyamide (A) can be manufactured in the same manner as a known manufacturing method for conventional semi-aromatic polyamide. For example, the semi-aromatic polyamide (A) can be manufactured by polycondensing a dicarboxylic acid and a diamine in a homogeneous solution. More specifically, a dicarboxylic acid and a diamine are heated in the presence of a catalyst as disclosed in WO03/085029 to obtain a lower condensate, and a shear stress is then applied to the melt of the low-condensation product to thereby polycondense the low-condensation product and obtain a semi-aromatic polyamide.

1-2. Semi-Aromatic Polyamide (B)

The semi-aromatic polyamide (B) contained in the semi-aromatic polyamide resin composition of the present invention has a heat of melting (ΔH) of 0 J/g or more and 5 J/g or less in a temperature rising process (temperature rising rate: 10° C./min) measured by the differential scanning calorimetry (hereinafter, referred to as DSC). The heat of melting can be an index of crystallinity of a polyamide resin. Crystallinity is enhanced when the heat of melting increases and is lowered when the heat of melting decreases. The heat of melting (ΔH) of the semi-aromatic polyamide (B) is preferably 5 J/g or less, i.e., low crystallinity, which allows for excellent compatibility with the semi-aromatic polyamide (A) and the excellent appearance of a molded product of the resin composition. The heat of melting (ΔH) of the semi-aromatic polyamide (B) is preferably 0 J/g. Further, the semi-aromatic polyamide (B) is preferably an amorphous resin.

The heat of melting (ΔH) as used herein is a value determined in accordance with JIS K7122, which is obtained from the area of an exothermic peak due to crystallization in the differential scanning calorimetry chart when scanned at a temperature rising rate of 10° C./min. In the present invention, the heat of melting (ΔH) is defined as a value obtained in a first temperature rise without erasing the thermal history.

The semi-aromatic polyamide (B) is not particularly limited as long as the polyamide has an aromatic group, and examples thereof may include polyamides containing a dicarboxylic acid component, such as a structural unit derived from terephthalic acid or isophthalic acid, and a diamine component, and polyamides containing a structural unit derived from a diamine having an aromatic group such as m-xylylenediamine.

Examples of the substantially amorphous polyamides and copolyamides for use as the semi-aromatic polyamide (B) having a heat of melting in the range described above include a polycondensate of isophthalic acid/terephthalic acid/1,6-hexanediamine/bis(3-methyl-4-aminocyclohexyl) methane, a polycondensate of terephthalic acid/2,2,4-trimethyl-1,6-hexanediamine/2,4,4-trimethyl-1,6-hexanediamine, a polycondensate of isophthalic acid/bis(3-methyl-4-aminocyclohexyl)methane/ω-laurolactam, a polycondensate of isophthalic acid/terephthalic acid/1,6-hexanediamine, a polycondensate of isophthalic acid/2,2,4-trimethyl-1,6-hexanediamine/2,4,4-trimethyl-1,6-hexanediamine, a polycondensate of isophthalic acid/terephthalic acid/2,2,4-trimethyl-1,6-hexanediamine/2,4,4-trimethyl-1,6-hexanediamine, a polycondensate of isophthalic acid/bis(3-methyl-4-aminocyclohexyl)methane/co-laurolactam, and polycondensates of isophthalic acid/terephthalic acid/other diamine components. These polyamides or copolyamides have excellent gas barrier properties by virtue of a structural unit having a benzene ring. In the semi-aromatic polyamide (B), the benzene ring of the terephthalic acid component and/or the isophthalic acid component constituting the polycondensate may be substituted with an alkyl group or a halogen atom. A polycondensate of isophthalic acid/terephthalic acid/1,6-hexanediamine is more preferable in view of its high effect for improving the gas barrier properties and surface appearance of the resultant molded product. These semi-aromatic polyamides (B) may be used in combination.

The heat of melting of the semi-aromatic polyamide (B) may be adjusted to fall within the above-mentioned range by a known method. For example, in the case of a polyamide having a structural unit derived from isophthalic acid, the molar ratio of the structural unit derived from isophthalic acid is adjusted to preferably 50% or more, more preferably 60% or more, relative to the total moles of the polyamides. This allows the control of the heat of melting of the semi-aromatic polyamide (B) to fall within the range described above.

Each of the structural units contained in the semi-aromatic polyamide (B) and the proportions thereof can be identified from the feed ratio used for manufacturing the semi-aromatic polyamide (B), or by a known means such as $^{13}$C-NMR measurement or $^{1}$H-NMR measurement.

The present invention may employ, for example, a semi-aromatic polyamide having a dicarboxylic acid component containing a structural unit derived from isophthalic acid and a diamine component containing a structural unit derived from an aliphatic diamine having 4 to 15 carbon atoms (hereinafter referred to as a semi-aromatic polyamide (B')).

The semi-aromatic polyamide (B') has a structural unit derived from isophthalic acid as the dicarboxylic acid component and, by virtue of such structural unit, exhibits excellent gas barrier properties in spite of low crystallinity.

The semi-aromatic polyamide (B') may contain a different dicarboxylic acid component other than the structural unit derived from isophthalic acid in an amount which does not impair the effects of the present invention. Examples of the other dicarboxylic acids include aromatic dicarboxylic acids such as terephthalic acid, 2-methyl terephthalic acid, and naphthalene dicarboxylic acid; a furandicarboxylic acid such as 2,5-furandicarboxylic acid; alicyclic dicarboxylic acids such as 1,4-cyclohexanedicarboxylic acid and 1,3-cyclohexanedicarboxylic acid; aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinate, azelaic acid, sebacic acid and suberic acid; aliphatic dicarboxylic acids having 11 or more carbon atoms; and structural units derived from any mixture thereof. Among them, a structural unit derived from an aromatic dicarboxylic acid is preferred, and a structural unit derived from terephthalic acid is particularly preferred.

The molar ratio of the structural unit derived from isophthalic acid to the structural unit derived from terephthalic acid in the semi-aromatic polyamide (B) is preferably 60/40 to 100/0, more preferably 60/40 to 90/10.

With a molar ratio of the structural unit derived from isophthalic acid to the structural unit derived from terephthalic acid in the above-mentioned range, the semi-aromatic polyamide (B') can be amorphous and have high compatibility with the semi-aromatic polyamide (A). This enables an enhancement of the impact resistance and the gas barrier properties of the polyamide resin composition.

The content of the structural unit derived from isophthalic acid, relative to the total dicarboxylic acid components in the semi-aromatic polyamide (B'), is preferably 40 mol % or more, more preferably 50 mol % or more. With the content of the structural unit derived from isophthalic acid relative to the total dicarboxylic acid components in the semi-aromatic polyamide (B'), being 40 mol % or more, the appearance and the gas barrier properties of a molded product becomes excellent.

The semi-aromatic polyamide (B') includes an aliphatic diamine having 4 to 15 carbon atoms as a diamine component. Examples of the aliphatic diamine having 4 to 15 carbon atoms include straight chain aliphatic diamines such as 1,4-butanediamine, 1,6-hexanediamine, 1,7-heptanediamine, 1,8-octanediamine, 1,9-nonanediamine, 1,10-decanediamine, 1,11-undecadiamine, 1,12-dodecanediamine, 1,13-tridecanediamine, 1,14-tetradecanediamine and 1,15-pentadecanediamine; chain aliphatic diamines having a side chain such as 2-methyl-1,5-pentanediamine, 2-methyl-1,6-hexane diamine, 2-methyl-1,7-heptanediamine, 2-methyl-1,8-octanediamine, 2-methyl-1,9-nonanediamine, 2-methyl-1,10-decanediamine or 2-methyl-1,11-undecanediamine; and alicyclic diamines such as 1,4-cyclohexanediamine and 1,3-cyclohexanediamine. These may be used individually or in a mixture thereof.

The aliphatic diamine unit having 4 to 15 carbon atoms is more preferably an aliphatic diamine having 4 to 9 carbon atoms. Particularly preferred is 1,6-hexanediamine. The 1,6-hexanediamine content relative to the total diamine components is 40 mol % to 100 mol %, preferably 60 mol % to 100 mol %. When the content of 1,6-hexanediamine as the diamine component is 40 mol % or more, a semi-aromatic polyamide (B') having low water absorption and excellent gas barrier properties can be obtained.

The intrinsic viscosity [η] of the semi-aromatic polyamide (B) is preferably 0.7 to 1.6 dl/g, more preferably 0.8 to 1.2 dl/g. The intrinsic viscosity [η] is measured in 96.5% sulfuric acid at 25° C. With an intrinsic viscosity [η] in the range, it becomes possible to enhance the flowability of the resin composition during molding, and the resultant molded product can have improved mechanical properties.

The terminal amino group content of the semi-aromatic polyamide (B) is preferably 10 to 400μ equivalent, more preferably 50 to 400μ equivalent, furthermore preferably 100 to 400μ equivalent. The presence of a terminal amino group in an amount of 10μ equivalent or more enables the compatibility with an olefin polymer (C) and the strength at a resin interface to be increased, and the adhesiveness with a fibrous filler (D) and a conductive material (E) to be enhanced, and as a result, the mechanical properties such as impact resistance tend to be improved. A terminal amino group in an amount of 400μ equivalent or lower tends to suppress water absorption at a low level and achieve and excellent long-term heat resistance.

The amount of the terminal amino group [$NH_2$] of the semi-aromatic polyamide (B) is measured by the following method. The semi-aromatic polyamide (A) in an amount of 0.5 to 0.7 g is precisely weighed, and dissolved in 30 mL of m-cresol. To the resultant are added 1 to 2 drops of 0.1% thymol blue/m-cresol solution as an indicator, thereby preparing a sample solution. The sample solution is titrated with 0.02-N p-toluenesulfonic acid solution until the color changes from yellow to blue violet to thereby measure the terminal amino group content ([$NH_2$], unit: μ equivalent/g).

The semi-aromatic polyamide (B) can be manufactured in the same manner as a known manufacturing method for conventional semi-aromatic polyamide. For example, the semi-aromatic polyamide (B) can be manufactured by polycondensing a dicarboxylic acid and a diamine in a homogeneous solution. More specifically, a dicarboxylic acid and a diamine are heated in the presence of a catalyst as disclosed in WO03/085029 to obtain a lower condensate, and a shear stress is then applied to the melt of the low-condensation product to thereby polycondense the low-condensation product and obtain a semi-aromatic polyamide.

1-3. Olefin Polymer (C)

The olefin polymer (C) includes a structural unit having a functional group including a hetero atom (hereinafter simply referred to as "functional group") in an amount of 0.1 to 1.5 parts by mass, preferably 0.5 to 1.2 parts by mass, relative to 100 parts by mass of the olefin polymer (C). The functional group preferably contains carbon, hydrogen and oxygen as a hetero atom. Specific examples of the functional group include functional groups selected from the group consisting of carboxylic acid groups (including carboxylic anhydride groups), ester groups, ether groups, aldehyde groups and ketone groups.

The structural unit having a functional group may be introduced by a modification reaction of the olefin polymer. Particularly preferred examples of the compounds for the modification reaction include unsaturated carboxylic acids and derivatives thereof. Specific examples of the unsaturated carboxylic acid or the derivative thereof include unsaturated carboxylic acids or unsaturated dicarboxylic acids such as acrylic acid, methacrylic acid, α-ethyl acrylic acid, maleic acid, fumaric acid, itaconic acid, citraconic acid, tetrahydrophthalic acid, methyltetrahydrophthalic acid, and endcis-bicyclo[2,2,1]hepto-5-ene-2,3-dicarboxylic acid (Nadic acid [trade mark]), and derivatives such as acid halides, amides, imides, acid anhydrides and esters thereof. Among them, an unsaturated dicarboxylic acid or an anhydride thereof is suitable, and maleic acid, Nadic acid (trade mark) and an acid anhydride thereof are particularly suitable.

A particularly preferred compound for the modification reaction of the olefin polymer is maleic anhydride. Maleic anhydride has a relatively high reactivity with an unmodified olefin polymer, and does not easily polymerize with each other, and tends to be stable as a basic structure. Various advantages therefore include obtainment of the olefin polymer (C) with stable quality.

Examples of skeletons of the olefin polymer (C) include known polymer skeletons such as ethylene polymers, propylene polymers, butene polymers, and copolymers of these olefins. Particularly preferred examples of the skeleton of the olefin polymer (C) include a copolymer of ethylene and an olefin having 3 or more carbon atoms.

The olefin polymer (C) may be obtained by, for example, the modification reaction of an unmodified olefin polymer with a compound having a corresponding functional group at a specific ratio. Preferred examples of the unmodified olefin polymer include ethylene-α-olefin copolymers.

The ethylene-α-olefin copolymer is a copolymer of ethylene and another olefin such as α-olefin having 3 to 10 carbon atoms, e.g., propylene, 1-butene, 1-hexene, 4-methyl-1-pentene, 1-octene, and 1-decene. Specific examples of the ethylene-α-olefin copolymer include ethylene-propylene copolymers, ethylene-1-butene copolymers, ethylene-1-hexene copolymers, ethylene-1-octene copolymers and ethylene-4-methyl-1-pentene copolymers. Among them, an ethylene-propylene copolymer, an ethylene-1-butene copolymer, an ethylene-1-hexene copolymer and an ethylene-1-octene copolymer are preferred.

The ethylene-α-olefin copolymer preferably includes a structural units derived from ethylene in an amount of 70 to 99.5 mol %, more preferably 80 to 99 mol %, and a structural unit derived from α-olefin in an amount of 0.5 to 30 mol %, more preferably 1 to 20 mol %.

A desirable ethylene-α-olefin copolymer has a melt flow rate (MFR) at 190° C. and with a load of 2.16 kg in accordance with ASTM D1238 of 0.01 to 20 g/10 min, preferably 0.05 to 20 g/10 min.

The method for manufacturing the ethylene-α-olefin copolymer is not particularly limited, and can be prepared by, for example, a known method using a transition metal catalyst such as a titanium (Ti), vanadium (V), chromium (Cr) or zirconium (Zr)-based catalyst. More specific examples of the manufacturing method include copolymerizing ethylene with one or more α-olefins having 3 to 10 carbon atoms in the presence of a Ziegler catalyst or a metallocene catalyst including a V compound and an organoaluminum compound. In particular, the manufacturing method using a metallocene catalyst is preferred.

From the ethylene-α-olefin copolymer, an olefin copolymer (C) may be manufactured by, for example, a so-called graft modification with a compound having a functional group.

The graft modification of an ethylene-α-olefin copolymer may be performed by a known method. Examples of the method include dissolving an ethylene-α-olefin copolymer in an organic solvent, and then adding an unsaturated carboxylic acid or a derivative thereof and a radical initiator or the like to the resultant solution for a reaction at a temperature of typically 60 to 350° C., preferably 80 to 190° C., for 0.5 to 15 hours, preferably 1 to 10 hours.

The organic solvent for dissolving an ethylene-α-olefin copolymer is not particularly limited, and examples thereof include aromatic hydrocarbon solvents such as benzene, toluene, and xylene, and aliphatic hydrocarbon solvents such as pentane, hexane, and heptane.

Other examples of the graft modification method of an ethylene-α-olefin copolymer include a method in which an ethylene-α-olefin copolymer is reacted with an unsaturated carboxylic acid or a derivative thereof, preferably in the absence of a solvent, with an extruder or the like. The reaction conditions in this case may include a reaction temperature of typically equal to or higher than the melting point of the ethylene-α-olefin copolymer, more specifically 100 to 350° C. The reaction time may be set to typically 0.5 to 10 minutes.

In order to achieve an efficient graft modification reaction of an ethylene-α-olefin copolymer with a compound having a functional group such as an unsaturated carboxylic acid, the modification reaction is preferably performed in the presence of a radical initiator. Examples of the radical initiator include organic peroxides, organic peresters, and azo compounds. Examples of the organic peroxide and the organic perester include benzoyl peroxide, dichlorobenzoyl peroxide, dicumyl peroxide, di-t-butyl peroxide, 2,5-dimethyl-2,5-di(peroxide benzoate)hexyne-3,1,4-bis(t-butylperoxyisopropyl)benzene, lauroyl peroxide, t-butylperacetate, 2,5-dimethyl-2,5-di(t-butylperoxy)hexyne-3,2,5-dimethyl-2,5-di(t-butylperoxy)hexane, t-butylperbenzoate, t-butylperphenylacetate, t-butylperisobutyrate, t-butylper-sec-octoate, t-butylperpivalate, cumylperpivalate and t-butylperdiethylacetate. Examples of the azo compound include azobisisobutyronitrile and dimethylazoisobutyrate. Among them, dialkyl peroxides such as dicumylperoxide, di-t-butylperoxide, 2,5-dimethyl-2,5-di(t-butylperoxy)hexyne-3,2,5-dimethyl-2,5-di(t-butylperoxy)hexane, and 1,4-bis(t-butylperoxyisopropyl)benzene are preferred. The radical initiator is used in a proportion of typically 0.001 to 1 parts by weight relative to 100 parts by weight of the unmodified ethylene-α-olefin copolymer.

The modified ethylene-α-olefin copolymer has a density measured in accordance with JIS K7112 of preferably 0.80 to 0.95 g/cm$^3$, more preferably 0.85 to 0.90 g/cm$^3$.

Further, the intrinsic viscosity [η] of the modified ethylene-α-olefin copolymer measured in decalin (decahydronaphthalene) solution at 135° C. is preferably 0.5 to 4.0 dl/g, more preferably 1.0 to 3 dl/g, furthermore preferably 1.5 to 3 dl/g. With an intrinsic viscosity [η] in the above-mentioned range, the resin composition of the present invention can exhibit both toughness and melt flowability at a high level.

The intrinsic viscosity [η] of the olefin polymer (C) in decalin at 135° C. is measured by a conventional method as follows. A sample in an amount of 20 mg is dissolved in 15 ml of decalin, and the specific viscosity (ηsp) is measured in an atmosphere at 135° C. with an Ubbelohde viscometer. To the decalin solution, 5 ml of decalin is further added for dilution, and the specific viscosity is measured in the same manner. The dilution and the specific viscosity measurement are further repeated twice, and based on the thus obtained measurements, the "ηsp/C" value is obtained by extrapolating concentration (C) to zero and the obtained value is used as the intrinsic viscosity [η].

The content of the structural units having a functional group which are contained in the olefin polymer (C) is 0.1 to 1.5 parts by mass, preferably 0.2 to 1.1 parts by mass relative to 100 parts by mass of the olefin polymer (C). When the content of the structural units having a functional group is excessively small, the effect for improving impact resistance of a resin composition may become low. Lack of the reaction or interaction between the functional group of the olefin polymer (C) and the terminal groups of the semi-aromatic polyamide (A) and the semi-aromatic polyamide (B) causes the olefin polymer (C) to easily aggregate and the interfacial strength with the polyamide resin to be decreased, thereby preventing the olefin polymer (C) from easily exhibiting its effect for sufficiently improving the impact resistance. On the other hand, when the amount of the structural units having a functional group is excessively large, the interaction between the semi-aromatic polyamide (A) and the semi-aromatic polyamide (B) becomes enhanced excessively, thereby lowering so that crystallinity and melt flowability, which may result in reduced moldability.

The content of the structural units having a functional group contained in the olefin polymer (C) can be identified from the feed ratio used for reacting the unmodified olefin polymer with a compound having a functional group, or by a known means such as $^{13}$C-NMR measurement or $^1$H-NMR measurement.

Specific examples of the NMR measurement conditions are as follows.

$^1$H-NMR measurement can be performed using an ECX400 nuclear magnetic resonance apparatus manufactured by JEOL Ltd. under the following conditions: solvent: deuterated o-dichlorobenzene, sample concentration: 20 mg/0.6 mL, measurement temperature: 120° C., observing nucleus: $^1$H (400 MHz), sequence: a single pulse, pulse width: 5.12 μseconds (45° pulse), repetition time: 7.0 seconds, and cumulative number: 500 or more. Hydrogen of tetramethylsilane is used as the reference chemical shift at 0 ppm. Alternatively, the peak derived from residual hydrogen of deuterated o-dichlorobenzene may be used as the reference chemical shift at 7.10 ppm to obtain similar results. The peaks of $^1$H derived from a functional group-containing compound may be assigned by a conventional method.

$^{13}$C-NMR measurement can be performed using an ECP500 nuclear magnetic resonance apparatus manufactured by JEOL Ltd. under the following conditions: solvent: o-dichlorobenzene/heavy benzene (80/20 vol %) mixture solvent, measurement temperature: 120° C., observing nucleus: $^{13}$C (125 MHz), single pulse proton decoupling, 45° pulse, repetition time: 5.5 seconds, and cumulative number: 10,000 or more, and reference chemical shift: 27.50 ppm. The various kinds of signals are assigned by a conventional method, and the quantitative determination can be performed based on the integrated value of signal strength.

Alternatively, the content of the structural unit having a functional group contained in the olefin polymer (C) may be conveniently measured by the following method. The functional group contents of different polymers each having a different functional group content are determined by NMR measurement, and each polymer with the determined functional group content is subjected to infrared spectroscopy (IR). A calibration curve between the intensity ratio of specific peaks of the infrared spectroscopy (IR) spectrum and the functional group content is created. The functional group content of any polymer can be determined based on the calibration curve. Although this method is more convenient than the NMR measurement described above, it is basically necessary to create a separate calibration curve based on the type of the base resin and the functional group. For this reason, this method is preferably used, for example, in a process control or the like for producing a resin in a commercial plant.

1-4. Fibrous Filler (D)

The semi-aromatic polyamide resin composition of the present invention may contain a fibrous filler (D). Examples of the fibrous filler (D) include glass fiber, wholly aromatic polyamide fiber (e.g. polyparaphenylene terephthalamide fiber, polymetaphenylene terephthalamide fiber, polyparaphenylene isophthalamide fiber, polymetaphenylene isophthalamide fiber, and fiber obtained from a condensate of diaminodiphenyl ether and terephthalic acid or isophthalic acid), boron fiber, and liquid crystal polyester fiber. One or a plurality of these may be used as the fibrous filler (D). Among them, at least one of glass fiber and wholly aromatic polyamide fiber is preferred as the fibrous filler (D), since the use thereof further improves the mechanical properties and heat resistance of a molded product obtained from the resin composition.

The average length of the fibrous filler (D) for use is preferably in a range of 1 μm to 20 mm, more preferably in a range of 5 μm to 10 mm, furthermore preferably in a range of 10 μm to 5 mm, from the viewpoint of maintaining the good moldability and improving the mechanical properties and the heat resistance of the resultant molded product. Further, the aspect ratio of the fibrous filler (D) is preferably in a range of 5 to 2,000, more preferably in a range of 30 to 600.

The fibrous filler (D) is preferably subjected to a surface treatment for improving adhesion to a matrix resin, in particular, the adhesion to polyamide, and substantially improving the mechanical properties of the resultant polyamide resin composition. Examples of the surface treatment agents include coupling agents such as silane coupling agents, titanium coupling agents, and aluminate coupling agents, and sizing agents. Examples of the coupling agent suitable for use include aminosilane, epoxysilane, methyltrimethoxysilane, methyltriethoxysilane, γ-glycidoxypropyltrimethoxysilane, vinyltriacetoxysilane, and vinyltrimethoxysilane. Preferred examples of the sizing agent for use include epoxy compounds, urethane compounds, carboxylic acid compounds, urethane/maleic acid modified compounds, and urethane/amine modified compounds. These surface treatment agents may be used individually or in combination. In particular, when a coupling agent and a sizing agent are used in combination, the adhesion between the fibrous filler (D) and a matrix resin, particularly a polyamide, is further improved, so that the mechanical properties of the resultant semi-aromatic polyamide resin composition is further enhanced. The mass reduction of the surface-treated fibrous filler (D) when heated at 625±20° C. for 10 minutes or more is preferably in a range of 0.01 to 8.0 parts by mass, more preferably in a range of 0.1 to 5.0 parts by mass, relative to 100 parts by mass of the surface-treated fibrous filler (D).

1-5. Conductive Material (E)

The semi-aromatic polyamide resin composition of the present invention may contain a conductive material (E). The inclusion of conductive material (E), for example, prevents the generation of static sparking of a molded fuel part and imparts a necessary conductivity necessary for electrostatic coating performed after molding into automotive parts. The conductive material in the present invention is defined as a material having a volume resistivity of 100 Ω·cm or less.

Examples of the conductive material (E) include carbon fiber, conductive carbon black, carbon fibril, carbon nanotube, metal fiber, metal powder, metal flake, metal oxide powder, and metal-coated fiber. Preferably the conductive material (E) is at least one member selected from the group consisting of carbon fiber, conductive carbon black, carbon fibril and carbon nanotube, having a low specific gravity and excellent balance between conductivity imparting effect and reinforcing effect.

In the present invention, the fibrous filler (D) may serve as conductive material (E). For example, carbon fiber, carbon fibril, carbon nanotube, metal fiber, metal-coated fiber may be a fibrous filler (D) as well as a conductive material (E).

Although any of pitch-based carbon fiber and PAN-based carbon fiber may be used as the carbon fiber, PAN-based carbon fiber is preferred due to excellence in elastic modulus and impact resistance. From the viewpoint of maintaining excellent moldability and improving the mechanical properties and the heat resistance of the resultant molded product, the average fiber length of the carbon fiber in a state before melt kneading is preferably in a range of 1 to 20 mm, more preferably in a range of 3 to 10 mm, furthermore preferably in a range of 5 to 8 mm. The aspect ratio of the carbon fiber is preferably in a range of 100 to 5,000, more preferably in a range of 300 to 2,000.

Examples of the conductive carbon black include the carbon black for conductive use disclosed in WO01/81473 or in Japanese Patent Application Laid-Open No. 2006-213798. Alternatively, a commercially available conductive carbon black such as: KETJEN BLACK EC600JD and EC300J available from Ketjen Black. International Co.; VULCAN XC-72 and XC-305 available from Cabot Corporation; PRINTEX XE2B available from Degussa; #5500 and #4500 available from Tokai Carbon Co., Ltd.; and #5400B available from Mitsubishi Chemical Corporation may be used.

Examples of the carbon fibril include the fine carbon fiber disclosed in WO94/23433. Alternatively, a commercially available carbon fibril such as BN fibril available from Hyperion Catalysis International, Inc. may be used.

Examples of the carbon nanotube include the multi-layer carbon nanotube disclosed in Japanese Patent No. 3761561.

The content of the conductive material (E) for achieving excellent balance between the conductivity and the mechanical properties is preferably in a range of 0.1 to 30 parts by mass, more preferably 02 to 25 parts by mass, furthermore preferably 0.3 to 20 parts by mass, relative to 100 parts by mass of the polyamide resin composition.

1-6. Optional Additive

The semi-aromatic polyamide resin composition of the present invention may contain, depending on the application, optional additives within a range that does not impair the effects of the present invention. Examples of optional additives include antioxidants (phenols, amines, sulfur compounds and phosphorus compounds), fillers (clay, silica, alumina, talc, kaolin, quartz, mica and graphite), heat stabilizers (lactone compounds, vitamin E, hydroquinones, copper halides and iodine compounds), light stabilizers (benzotriazoles, triazines, benzophenones, benzoates, hindered amines and oxanilides), other polymers (polyolefins, ethylene-propylene copolymers, olefin copolymers such as ethylene-1-butene copolymers, olefin copolymers such as propylene-1-butene copolymers, polystyrene, polyamides, polycarbonates, polyacetal, polysulfone, polyphenylene oxide, fluorine resins, silicone resins and LCP), flame retardants (bromine-based retardants, chlorine-based retardants, phosphorus-based retardants, antimony-based retardants and inorganic-based retardants), fluorescent whitening agents, plasticizers, thickeners, antistatic agents, releasing agents, pigments, nucleating agents, and various known compounding agents.

The content of the optional additives in the polyamide resin composition of the present invention varies depending on the type of the components, but it is preferably 0 to 10 parts by mass, more preferably 0 to 5 parts by mass, furthermore preferably 0 to 1 parts by mass, relative to 100 parts by mass of the total of the semi-aromatic polyamide (A), the semi-aromatic polyamide (B), the olefin polymer (C), and the fibrous filler (D).

1-7. Content of Each Component

The semi-aromatic polyamide resin composition of the present invention preferably includes 20 to 60 parts by mass of the semi-aromatic polyamide (A), 5 to 30 parts by mass of the semi-aromatic polyamide (B), 1 to 30 parts by mass of the olefin polymer (C), and 0 to 60 parts by mass, preferably 5 to 60 parts by mass, more preferably 5 to 50 parts by mass of the fibrous filler (D), relative to 100 parts by mass of the total of the semi-aromatic polyamide (A), the semi-aromatic polyamide (B), the olefin polymer (C), and the fibrous filler (D).

Among them, the mass ratio of the semi-aromatic polyamide (B) to the total mass of the semi-aromatic polyamide (A) and the semi-aromatic polyamide (B), i.e. the relationship $(B)/((A)+(B))$, is preferably 0.05 to 0.5, more preferably 0.1 to 0.3 where (A) is the mass of the semi-aromatic polyamide (A), and the (B) is the mass of the semi-aromatic polyamide (B). When the above ratio of (B) is 0.05 or less, the effect for improving the gas barrier properties of the resultant resin composition tends to be insufficient. When the above ratio of (B) is 0.5 or more, while the gas barrier properties of the resin composition can be enhanced, but moldability such as injection flowability and releasability may be impaired.

The mass ratio of the olefin polymer (C), referred to as (C), to the total mass of the semi-aromatic polyamide (A) and the semi-aromatic polyamide (B), i.e. the relationship $(C)/((A)+(B))$, is preferably 0.03 to 0.75, more preferably 0.07 to 0.5 where (A) is the mass of the semi-aromatic polyamide (A), and the (B) is the mass of the semi-aromatic polyamide (B). When the above ratio of (C) is 0.03 or less, the impact resistance strength of the resultant resin composition may be insufficient. When a proportion of (C) is 0.75 or more, gas barrier properties, heat resistance, mechanical properties, and moldability tend to be impaired.

2. Manufacturing Method of Semi-Aromatic Polyamide Resin Composition

The semi-aromatic polyamide resin composition of the present invention may be manufactured by, for example, a method including the step of mixing the semi-aromatic polyamide (A), the semi-aromatic polyamide (B), and the olefin polymer (C) in the above-mentioned ratios, together with the fibrous filler (D), the conductive material (E), and other components as needed by a known method using a henschel mixer, a V-blender, a ribbon blender, a tumbler blender or the like; and a method further including the steps of melt kneading the above-obtained mixture using a monoaxial extruder, a multiaxial extruder, a kneader, a banbury mixer or the like, and subsequently granulating or grinding the kneaded product.

As the melt kneading method, use can be made of a conventional method, such as the method disclosed in PTL 1.

3. Molded Product Including Semi-Aromatic Polyamide Resin Composition

Examples of the molded products made of the polyamide resin composition of the present invention include: exterior automotive parts such as a radiator grille, a rear spoiler, a wheel cover, a hubcap, a cowl vent grille, an air outlet louver, an air scoop, a hood bulge, a fender, and a backdoor; interior parts of an automotive engine compartment such as a cylinder head cover, an engine mount, an air intake manifold, a throttle body, an air intake pipe, a radiator tank, a radiator support, a water pump inlet, a water pump outlet, a thermostat housing, a cooling fan, a fan shroud, an oil pan, an oil filter housing, an oil filler cap, an oil level gauge, a timing belt, a timing belt cover, and an engine cover; automotive fuel system parts such as a fuel cap, a fuel filler tube, an automotive fuel tank, a fuel sender module, a fuel cut-off valve, a quick connector, a canister, a fuel delivery pipe, and a fuel filler neck; automotive drive train parts such as a shift lever housing and a propeller shaft; automotive chassis parts such as a stabilizer bar linkage rod; automotive functional parts such as a window regulator, a door lock, a door handle, an outside door mirror stay, an accelerator pedal, a pedal module, a seal ring, a bearing, a bearing retainer, a gear, and an actuator; automotive electronic parts such as a wire harness connector, a relay block, a sensor housing, an encapsulation, an ignition coil, and a distributor cap; fuel parts for general-purpose apparatus such as a fuel tank for general-purpose apparatus (a brushcutter, a lawn mower and a chain saw); and electric and electronic parts, such as a connector and an LED reflector. Due to excellence in both of toughness such as impact resistance and elongation and mechanical properties such as tensile strength, as well as in properties such as heat resistance, low water absorption, chemical resistance, and long-term heat resistance, the polyamide resin composition of the present invention may be preferably used as an automotive fuel tank, a quick connector, a bearing retainer, a fuel tank for general purpose equipment, a fuel cap, a fuel filler neck, a fuel sender module, a hubcap, a fender, or a backdoor, in particular.

4. Constitution in Aspect of the Present Invention

An aspect of the present invention provides the following constitutions.

[1] A semi-aromatic polyamide resin composition including:

20 to 60 parts by mass of a semi-aromatic polyamide (A') containing a structural unit derived from terephthalic acid and a structural unit derived from adipic acid as dicarboxylic acid components, and a structural unit derived from a straight chain aliphatic diamine having 4 to 10 carbon atoms as a diamine component;

5 to 30 parts by mass of a semi-aromatic polyamide (B') containing a structural unit derived from isophthalic acid as a dicarboxylic acid component, and a structural unit derived from an aliphatic diamine having 4 to 15 carbon atoms as a diamine component;

1 to 30 parts by mass of an olefin polymer (C) containing 0.1 to 1.5 parts by mass of a structural unit having a functional group; and 5 to 60 parts by mass of a fibrous filler (D)

(with the proviso that the total of (A'), (if), (C), and (D) is 100 parts by mass); and a mass ratio (B')/((A')+(B')) is 0.05 to 0.5.

[2] The semi-aromatic polyamide resin composition according to [1], wherein a molar ratio of the structural unit derived from terephthalic acid to the structural unit derived from adipic acid contained in the semi-aromatic polyamide (A') is 40/60 to 80/20.

[3] The semi-aromatic polyamide resin composition according to [1] or [2], wherein the semi-aromatic polyamide (B') has 60 to 100 mol % of the structural units derived from isophthalic acid and 0 to 40 mol % of the structural units derived from terephthalic acid, each relative to the total dicarboxylic acid components contained in the semi-aromatic polyamide (B').

[4] The semi-aromatic polyamide resin composition according to any one of [1] to [3], wherein 80 to 100 mol % of the total diamine components contained in the semi-aromatic polyamide (A') is the structural unit derived from 1,6-hexanediamine.

[5] The semi-aromatic polyamide resin composition according to any one of [1] to [4], wherein 60 to 100 mol % of the total diamine components contained in the semi-aromatic polyamide (B') is 1,6-hexanediamine.

[6] The semi-aromatic polyamide resin composition according to any one of [1] to [5], wherein the functional group of the olefin polymer (C) is a functional group selected from the group consisting of a carboxylic acid, an ester, an ether, an aldehyde, and a ketone.

[7] The semi-aromatic polyamide resin composition according to [6], wherein the olefin polymer (C) includes a structural unit derived from maleic anhydride.

[8] The semi-aromatic polyamide resin composition according to any one of [1] to [7], further including a conductive material (E).

[9] The semi-aromatic polyamide resin, composition according to [8], wherein the conductive material (E) is at least one member selected from the group consisting of carbon fiber, conductive carbon black, carbon fibril and carbon nanotube.

[10] A molded product containing the semi-aromatic polyamide resin composition according to any one of [1] to [9].

[11] A quick connector containing the semi-aromatic polyamide resin composition according to any one of [1] to [9].

EXAMPLES

With reference to Examples, the present invention is more specifically described as follows. The scope of the present invention, however, is not limited thereto.

Manufacturing of Polyamide Resin

Polyamides (A-1) to (A-3), (a-1) to (a-2), and (B-1) were prepared as follows.

Polyamide (A-1)

An autoclave having an internal capacity of 13.6 L was charged with 1,787 g (10.8 mol) of terephthalic acid, 2,800 g (24.1 mol) of 1,6-hexane diamine, 1,921 g (13.1 mol) of adipic acid, 5.7 g of sodium hypophosphite monohydrate, and 554 g of distilled water, and then the autoclave was purged with nitrogen. Reaction was initiated by starting the agitation at 190° C., and elevating the internal temperature of the autoclave to 250° C. over 3 hours. At this time, the internal pressure of the autoclave was increased to 3.01 MPa. The reaction was continued for 1 hour and then the air in the autoclave was discharged to the atmosphere from a spray nozzle disposed at the bottom of the autoclave so as to withdraw a low-condensation product. The low-condensation product was then cooled to room temperature, ground to a particle size of 1.5 mm or less by a crusher, and dried at 110° C. for 24 hours. The resultant low-condensation product had a moisture content of 3,600 ppm and an intrinsic viscosity [$\eta$] of 0.14 dl/g. Subsequently, the low-condensation product was charged into a shelf-type solid-phase polymerization apparatus, and after purging with nitrogen, the temperature was elevated to 220° C. over 1 hour and 30 minutes to start a reaction. The reaction was continued for 1 hour, and then the temperature was cooled to room temperature, thereby obtaining a polyamide. The resultant polyamide had an intrinsic viscosity [$\eta$] of 0.48 dl/g. A polyamide resin was then prepared by melt polymerization using a biaxial extruder with a screw diameter of 30 mm and an LID of 36, at a barrel preset temperature of 330° C., a screw rotation speed of 200 rpm, and a resin feed rate of 6 Kg/h. The thus prepared polyamide resin had an intrinsic viscosity [$\eta$] of 0.9 dl/g and a melting point $Tm_1$ of 295° C., with a terminal amine content of 180 t equivalent.

Polyamide (A-2)

A polyamide resin was prepared in substantially the same manner as in A-1 except that the amount of terephthalic acid was changed to 2,184 g and the amount of adipic acid was changed to 1,572 g. The resultant polyamide resin had an intrinsic viscosity [$\eta$] of 0.94 dl/g and a melting point $Tm_1$ of 310° C.

Polyamide (A-3)

A polyamide resin was prepared in substantially the same manner as in A-1 except that the amount of terephthalic acid was changed to 2,482 g and the amount of adipic acid was changed to 1,310 g. The resultant polyamide resin had an intrinsic viscosity [$\eta$] of 0.90 dl/g and a inciting point $Tm_1$ of 320° C.

Polyamide (a-1)

An autoclave having an internal capacity of 13.6 L was charged with 1,708 g (10.3 mol) of terephthalic acid, 2,800 g (24.1 mol) of 1,6-hexane diamine, 516 g (3.1 mol) of isophthalic acid, 1,537 g (10.5 mol) of adipic acid, 5.7 g of sodium hypophosphite monohydrate, and 535 g of distilled water, and then the autoclave was purged with nitrogen. Reaction was initiated by starting the agitation at 190° C., and elevating the internal temperature of the autoclave to 250° C. over 3 hours. At this time, the internal pressure of the autoclave was increased to 3.02 MPa. The reaction was continued for 1 hour and then the air in the autoclave was discharged to the atmosphere from a spray nozzle disposed at the bottom of the autoclave so as to withdraw a low-condensation product. The low-condensation product was then cooled to room temperature, ground to a particle size of 1.5 mm or less by a crusher, and dried at 110° C. for 24 hours. The resultant low-condensation product had a moisture content of 4,000 ppm and an intrinsic viscosity [η] of 0.15 dl/g. Subsequently, the low-condensation product was charged into a shelf-type solid-phase polymerization apparatus, and after purging with nitrogen, the temperature was elevated to 180° C. over 1 hour and 30 minutes to start a reaction. The reaction was continued for 1 hour and 30 minutes, and then the temperature was cooled to room temperature, thereby obtaining a polyamide. The resultant polyamide had an intrinsic viscosity [η] of 0.20 dl/g. A polyamide resin was then prepared by melt polymerization using a biaxial extruder with a screw diameter of 30 mm and an L/D of 36, at a barrel preset temperature of 330° C., a screw rotation speed of 200 rpm, and a resin feed rate of 6 Kg/h. The thus prepared polyamide resin had an intrinsic viscosity [η] of 0.91 dl/g and a melting point $Tm_1$ of 279° C., with a terminal amine content of 170μ equivalent.

Polyamide (a-2)

An autoclave having an internal capacity of 13.6 L was charged with 3,971 g (23.9 mol) of terephthalic acid, 3,051 g (19.3 mol) of 1,9-nonanediamine, 763 g (4.8 mol) of 2-methyl-1,8-octanediamine, 36.5 g (0.3 mol) of benzoic acid, 5.7 g of sodium hypophosphite monohydrate, and 780 g of distilled water, and then the autoclave was purged with nitrogen. Reaction was initiated by starting the agitation at 190° C., and elevating the internal temperature of the autoclave to 250° C. over 3 hours. At this time, the internal pressure of the autoclave was increased to 3.03 MPa. The reaction was continued for 1 hour and then the air in the autoclave was discharged to the atmosphere from a spray nozzle disposed at the bottom of the autoclave so as to withdraw a low-condensation product. The low-condensation product was then cooled to room temperature, ground to a particle size of 1.5 mm or less by a crusher, and dried at 110° C. for 24 hours. The resultant low-condensation product had a moisture content of 4,100 ppm and an intrinsic viscosity [η] of 0.13 dl/g. Subsequently, the low-condensation product was charged into a shelf-type solid-phase polymerization apparatus, and after purging with nitrogen, the temperature was elevated to 180° C. over 1 hour and 30 minutes to start a reaction. The reaction was continued for 1 hour and 30 minutes, and then the temperature was cooled to room temperature, thereby obtaining a polyamide. The resultant polyamide had an intrinsic viscosity [η] of 0.17 dl/g. A polyamide resin was then prepared by melt polymerization using a biaxial extruder with a screw diameter of 30 mm and an L/D of 36, at a barrel preset temperature of 340° C., a screw rotation speed of 200 rpm, and a resin feed rate of 5 Kg/h. The thus prepared polyamide resin had an intrinsic viscosity [η] of 1.09 dl/g and a melting point $Tm_1$ of 302° C., with a terminal amine content of 25μ equivalent.

Polyamide (B-1)

An autoclave having an internal capacity of 13.6 L was charged with 1,390 g (8.4 mol) of terephthalic acid, 2,800 g (24.1 mol) of 1,6-hexane diamine, 2,581 g (15.5 mol) of isophthalic acid, 109.5 g (0.9 mol) of benzoic acid, 5.7 g of sodium hypophosphite monohydrate, and 545 g of distilled water, and then the autoclave was purged with nitrogen. Reaction was initiated by starting the agitation at 190° C., and elevating the internal temperature of the autoclave to 250° C. over 3 hours. At this time, the internal pressure of the autoclave was increased to 3.02 MPa. The reaction was continued for 1 hour and then the air in the autoclave was discharged to the atmosphere from a spray nozzle disposed at the bottom of the autoclave so as to withdraw a low-condensation product. The low-condensation product was then cooled to room temperature, ground to a particle size of 1.5 mm or less by a crusher, and dried at 110° C. for 24 hours. The resultant low-condensation product had a moisture content of 3,000 ppm and an intrinsic viscosity [η] of 0.14 dl/g. A polyamide resin was then prepared by melt polymerization using a biaxial extruder with a screw diameter of 30 mm and an L/D of 36, at a barrel preset temperature of 330° C., a screw rotation speed of 200 rpm, and a resin feed rate of 6 Kg/h. The thus prepared polyamide resin had a heat of melting ΔH of 0 J/g. The polyamide resin had an intrinsic viscosity [η] of 0.68 dl/g, and no melting point $Tm_1$ as observed. Further, the terminal amine content was 270 μ equivalent.

Moisture Content

The moisture content of the resultant low-condensation product was obtained by weighing a sample in an amount of about 0.2 g, and using a Karl Fischer moisture meter, heating the sample at 200° C. and measuring the amount of generated moisture (solid vaporization method).

Intrinsic Viscosity [η]

The intrinsic viscosity [η] of the resultant polyamide was measured as follows. 0.5 g of the polyamide was dissolved in 50 ml of 96.5% sulfuric acid solution. The flowing time of the resultant solution at 25° C.±0.05° C. was measured using an Ubbelohde viscometer, and intrinsic viscosity was calculated based on the following equation:

$$[\eta]=\eta SP/(C(1+0.205\eta SP)).$$

[η]: intrinsic viscosity (dl/g)
ηSP: specific viscosity
C: sample concentration (dl/g)
t: flowing time of sample solution (second)
$t_0$: flowing time of blank sulfuric acid (second)
ηSP=(t−$t_0$)/$t_0$ Melting Point $Tm_1$ The melting point $Tm_1$ of the obtained polyamide was measured in accordance with JIS K7121 as follows. Using a DSC7 manufactured by Perkin-Elemer Corp., the polyamide was held at 350° C. for 5 minutes and then cooled to 23° C. at a rate of 10° C./min. The temperature was then raised at a rate of 10° C./min. The melting point $Tm_1$ was defined as the peak top value of the endothermic peak based on the melting under the above-mentioned conditions. The heat of melting ΔH was obtained from the area of the exothermic peak of the crystallization in accordance with JIS K7122.

Olefin Polymer

The olefin polymers (C-1) to (C-2) and (c-1) were prepared as follows.

Olefin Polymer (C-1)

A glass flask fully purged with nitrogen was charged with 0.63 mg of bis(1,3-dimethyl-cyclopentadienyl)zirconium dichloride, and then with 1.57 ml of a toluene solution of methylaminoxane (Al: 0.13 mmol/liter) and 2.43 ml of toluene to obtain a catalyst solution.

Next, a stainless steel autoclave having an internal capacity of 2 liters was fully purged with nitrogen and charged with 912 ml of hexane and 320 ml of 1-butene, and the temperature of the autoclave was elevated to 80° C. Subsequently, 0.9 mmol of triisobutylaluminum and 2.0 ml (0.0005 mmol in terms of Zr) of the prepared catalyst solution were injected into the autoclave using ethylene to start the polymerization reaction. Ethylene was continuously supplied to maintain the total pressure at 8.0 kg/cm$^2$-G, and the polymerization was performed at 80° C. for 30 minutes.

After terminating the polymerization reaction by introducing a small amount of ethanol into the system, the unreacted ethylene was purged. A white solid was precipitated by feeding the resultant solution into a large excess amount of methanol. The white solid was collected by filtration and dried overnight under reduced pressure to obtain a white solid (ethylene-1-butene copolymer). The resultant ethylene-1-butene copolymer had a density of 0.865 g/cm$^3$ and an MFR (ASTMD1238 standard, at 190° C., load: 2,160 g) of 0.5 g/10 minute, with a 1-butene structural unit content of 4 mol %.

The resultant ethylene-1-butene copolymer in an amount of 100 parts by weight was mixed with 0.5 parts by weight of maleic anhydride and 0.04 parts by weight of an peroxide (PERHEXYNE 2513, trademark, manufactured by NOF Corporation). The resultant mixture was subjected to melt graft modification in a mono axial extruder at a preset temperature of 230° C. to obtain a modified ethylene-1-butene copolymer. The amount of the grafted maleic anhydride in the obtained modified ethylene-1-butene copolymer was 0.46 wt %. The intrinsic viscosity [η] measured in a decalin solution at 135° C. was 1.98 dl/g.

Olefin Polymer (C-2)

The olefin polymer (C-2) was prepared in substantially the same manner as in the olefin polymer (C-1) except that the amount of maleic anhydride to be added to the unmodified ethylene-1-butene copolymer for modification in the manufacturing of the olefin polymer (C-1) was changed to 1.0 part by weight. The amount of maleic anhydride graft modification was 0.98 wt %. The intrinsic viscosity [η] measured in a decalin solution at 135° C. was 1.90 dl/g.

Olefin Polymer (c-1)

Except that the amount of maleic anhydride to be added to the unmodified ethylene-1-butene copolymer for modification in the manufacturing of the olefin polymer (C-1) was changed to 2.0 parts by weight, the olefin polymer (c-1) was prepared in substantially the same manner as in the olefin polymer (C-1). The amount of maleic anhydride graft modification was 1.89 wt %. The intrinsic viscosity [η] measured in a decalin solution at 135° C. was 1.78 dl/g.

Composition

The composition of an olefin polymer, for example, the contents (mol %) of ethylene and an α-olefin having 3 or more carbon atoms and the content (mass %) of a structural unit having a functional group, was measured by $^{13}$C-NMR. The measurement conditions were as follows:

Measurement apparatus: nuclear magnetic resonance apparatus (ECP500, manufactured by JEOL Ltd.)

Observing nucleus: $^{13}$C (125 MHz)

Sequence: single pulse proton decoupling

Pulse width: 4.7 μseconds (45° pulse)

Repetition time: 5.5 seconds

Cumulative number: 10,000 or more

Solvent: mixture solvent of ortho-dichlorobenzene/deuterated benzene (volume ratio: 80/20)

Sample concentration: 55 mg/0.6 mL

Measurement temperature: 120° C.

Reference value of chemical shift: 27.50 ppm

Density

The density of an ethylene-1-butene copolymer was measured at 23° C., using a density gradient tube in accordance with HS K7112.

Melt Flow Rate (MFR)

The melt flow rate (MFR) of an ethylene-1-butene copolymer was measured at 190° C. with a load of 2.16 kg in accordance with ASTM D1238. The unit for MFR is g/10 min.

Intrinsic Viscosity [η]

The intrinsic viscosity [η] of an olefin polymer was measured in decalin as a solvent at 135° C.

More specifically, about 20 mg of an acid-denatured polyolefin resin (B) was dissolved in 25 ml of decalin, and the specific viscosity ηsp was then measured in an oil bath at 135° C. using an Ubbelohde viscometer. The decalin solution was diluted with 5 ml of decalin, the specific viscosity ηsp was then measured in the same manner as described above. The dilution is further repeated twice, and the "ηsp/C" value is obtained by extrapolating concentration (C) to zero, as the intrinsic viscosity [η] (unit: dl/g). (Refer to the following formula).

$$[\eta]=\lim(\eta SP/C) \ (C \to 0)$$

Preparation of Resin Composition

Polyamide (A-1) to (A-3) or polyamide (a-1) to (a-2), polyamide (B-1), olefin polymer (C-1) to (C-2) or an olefin polymer (c-1), glass fiber (FT756D, manufactured by Owens Corning Corp., glass fiber length: 3 mm, aspect ratio: 300) and carbon fiber (HT-C413, manufactured by Toho Tenax Co., Ltd., carbon fiber length: 6 mm, aspect ratio: 1,000) were mixed together at the composition ratio shown in Table 1 with a tumbler blender. The resultant mixture of raw materials was then melt kneaded in a biaxial extruder (TEX30α, manufactured by Japan Steel Works Ltd.) at a cylinder temperature of (Tm$_1$+15°) C., then extruded into a strand, and cooled in a water bath. Then, the strand was fed into a pelletizer to cut and obtain pellets of the resin composition.

With respect to each of the obtained resin compositions, a sample piece was prepared under the below-mentioned conditions and subjected to the below-mentioned tests. The test results are summarized in Table 1.

Melting Point Tm$_2$

The melting point Tm$_2$ of the obtained polyamide was measured as follows. Using a DSC7 manufactured by Perkin-Elmer Corp., the temperature of the resin composition was raised at a rate of 10° C./min. The melting point Tm$_2$ was defined as the peak top value of the endothermic peak based on the melting under the above-mentioned conditions.

IZOD Impact Strength

A sample piece with a notch having a thickness of 3.2 mm was prepared using the below-mentioned injection molding machine under the below-mentioned molding conditions. The IZOD impact strength of the sample piece was measured at 23° C. and under a relative humidity of 50% in accordance with ASTM D256.

Molding machine: SE50DU manufactured by Sumitomo Heavy Industries Co., Ltd.

Molding machine cylinder temperature: (Tm$_2$+15°) C.

Mold temperature: 120° C.

Bending Test (Flexural Modulus and Flexural Strength)

A sample piece having a length of 64 mm, a width of 6 mm, and a thickness of 0.8 min was prepared using the below-mentioned injection molding machine under the below-mentioned molding conditions and was allowed to stand in a nitrogen atmosphere at 23° C. for 24 hours. The sample piece was subjected to a bending test at 23° C. and in a relative humidity of 50%, using a bending tester AB5 manufactured by NTESCO, with a span of 26 mm, a bending speed of 5 min/min to measure the flexural strength and the modulus of elasticity.

Molding machine: TUPARL TR40S3A manufactured by Sodick Plastic Co., Ltd.
Molding machine cylinder temperature: $(Tm_2+15°)$ C.
Mold temperature: 120° C.

Fuel Permeability

A 100-mm square sample piece with a thickness of 2 mm was prepared using the below-mentioned injection molding machine under the below-mentioned molding conditions, and a disc-shaped sample having a diameter of 45 mm was cut out from the square sample piece. An opening of a SUS container (Area of the opening section: $77.07\times10^{-4}$ $m^2$) having a volume of 20 mL and containing 10 mL of a simulation fuel CE10 (toluene/isooctane/ethanol=45/45/1.0 vol %) was sealed by setting the disc-shaped sample in the opening, thereby obtaining a test specimen. The test specimen was placed in a thermostat apparatus (60° C.), and the change in the weight of the specimen was measured for evaluating the fuel permeability.

Molding machine: EC75N-2A, manufactured by Toshiba Machine Co., Ltd.
Molding machine cylinder temperature: $(Tm_2+15°)$ C.
Mold temperature: 120° C.

Surface Resistance

A 100-mm square sample piece with a thickness of 2 mm obtained by molding in the above-mentioned manner was allowed to stand for 24 hours in an atmosphere where the temperature is 23° C. and relative humidity is 50%. Using a DC voltage and current source/monitor 6241A with an ASP probe (4-probe), manufactured by ADC Corp., the surface resistivity at one point in the central portion of the sample piece was then measured in accordance with HS K7194.

Injection Flowability

The flow length (mm) of a resin in the mold was measured using a bar-flow mold with a width of 10 mm and a thickness of 0.5 mm and by injecting under the below-mentioned conditions. The longer the flow length, better is the flowability.

Molding machine: EC75N-2A, manufactured by Toshiba Machine Co., Ltd.
Preset pressure for injection: 2,000 $kg/cm^2$
Molding machine cylinder temperature: $(Tm_2+15°)$ C.
Mold temperature: 120° C.

Releasability

A sample piece with a length of 64 mm, a width of 6 mm, and a thickness of 0.8 mm was prepared by injection molding using the below-mentioned injection molding machine under the below-mentioned molding conditions. During the molding, the shortest cooling time necessary for easily taking out the molded product without causing deformation of the molded product by a discharge pin, and without suffering from adhesion to the mold on the stationary side or the movable side, was determined for measuring the shortest molding cycle (time required for obtaining one molded product). The releasability was evaluated as rank A for a molding cycle of less than 16 seconds, rank B for a molding cycle of 16 seconds or more and less than 20 seconds, and rank C for a molding cycle of 20 seconds or more.

Molding machine: TUPARL TR40S3A manufactured by Sodick Plastic Co., Ltd.
Molding machine cylinder temperature: $(Tm_2+1.5°)$ C.
Mold temperature: 120° C.

TABLE 1

| | | Example | | | | | | | |
|---|---|---|---|---|---|---|---|---|---|
| | | 1 | 2 | 3 | 4 | 5 | 6 | 7 | 8 |
| Semi-aromatic polyamide (A) | A-1 mass % | 49.5 | 44 | 38.5 | — | 44 | — | 44 | 52 |
| | A-2 mass % | — | — | — | 44 | — | — | — | — |
| | A-3 mass % | — | — | — | — | — | 44 | — | — |
| Semi-aromatic polyamide | a-1 mass % | — | — | — | — | — | — | — | — |
| | a-2 mass % | — | — | — | — | — | — | — | — |
| Semi-aromatic polyamide (B) | B-1 mass % | 5.5 | 11 | 16.5 | 11 | 11 | 11 | 11 | 13 |
| [B]/([A] + [B]) | | 0.1 | 0.2 | 0.3 | 0.2 | 0.2 | 0.2 | 0.2 | 0.2 |
| Denatured olefin polymer (C) | C-1 mass % | 15 | 15 | 15 | 15 | 15 | 15 | — | 5 |
| | C-2 mass % | — | — | — | — | — | — | 15 | — |
| Denatured olefin polymer | c-1 mass % | — | — | — | — | — | — | — | — |
| [C]/([A] + [B]) | | 0.27 | 0.27 | 0.27 | 0.27 | 0.27 | 0.27 | 0.27 | 0.08 |
| Filler (D) mass % | | 30 | 30 | 30 | 30 | 15 | 30 | 30 | 30 |
| Conductive material (E) mass % | | — | — | — | — | 15 | — | — | — |
| Melting point ° c. | | 294 | 293 | 293 | 307 | 292 | 320 | 293 | 293 |
| IZOD impact strength 23° c. J/m | | 247 | 253 | 248 | 230 | 273 | 229 | 285 | 140 |
| Flexural modulus/MPa | | 6020 | 5880 | 6010 | 6430 | 9670 | 6030 | 5750 | 6950 |
| Flexural strength/MPa | | 194 | 187 | 193 | 180 | 237 | 185 | 185 | 240 |
| Fuel Permeability mg/day | | 1.58 | 1.28 | 1.20 | 1.09 | 1.35 | 1.01 | 1.25 | 1.05 |
| Surface resistance $\Omega/cm^2$ | | >$10^7$ | >$10^7$ | >$10^7$ | >$10^7$ | 105 | >$10^7$ | >$10^7$ | >$10^7$ |
| Injection flowability mm | | 25 | 21 | 18 | 19 | 21 | 28 | 16 | 22 |
| Releasability (moldability) | | A | A | A | A | A | A | B | A |

| | | Comparative Example | | | | | Reference Example |
|---|---|---|---|---|---|---|---|
| | | 1 | 2 | 3 | 4 | 5 | 9T |
| Semi-aromatic polyamide (A) | A-1 mass % | 55 | 22 | — | 56 | 44 | — |
| | A-2 mass % | — | — | — | — | — | — |
| | A-3 mass % | — | — | — | — | — | — |
| Semi-aromatic polyamide | a-1 mass % | — | — | 55 | — | — | — |
| | a-2 mass % | — | — | — | — | — | 65 |

TABLE 1-continued

| | | | | | | | |
|---|---|---|---|---|---|---|---|
| Semi-aromatic polyamide (B) | B-1 mass % | — | 33 | — | 14 | 11 | — |
| [B]/([A] + [B]) | | — | 0.6 | — | 0.2 | 0.2 | — |
| Denatured olefin polymer (C) | C-1 mass % | 15 | 15 | 15 | — | — | 5 |
| | C-2 mass % | — | — | — | — | — | — |
| Denatured olefin polymer | c-1 mass % | — | — | — | — | 15 | — |
| [C]/([A] + [B]) | | — | 0.27 | — | 0.00 | 0.27 | — |
| Filler (D) mass % | | 30 | 30 | 30 | 30 | 30 | 30 |
| Conductive material (E) mass % | | — | — | — | — | — | — |
| Melting point ° c. | | 295 | 289 | 278 | 293 | 292 | 302 |
| IZOD impact strength 23° c. J/m | | 237 | 230 | 265 | 125 | 285 | 132 |
| Flexural modulus/MPa | | 6050 | 6290 | 5770 | 8210 | 5540 | 6830 |
| Flexural strength/MPa | | 190 | 182 | 189 | 252 | 179 | 239 |
| Fuel Permeability mg/day | | 2.29 | 0.90 | 1.24 | 1.01 | 1.24 | 1.89 |
| Surface resistance Ω/cm$^2$ | | >10$^7$ | >10$^7$ | >10$^7$ | >10$^7$ | >10$^7$ | >10$^7$ |
| Injection flowability mm | | 35 | 12 | 14 | 39 | 6 | 10 |
| Releasability (moldability) | | A | C | C | A | B | B |

Each of the resin composition of Examples 1 to 8 has a higher melting point and is excellent in all of IZOD impact strength, flexural modulus, flexural strength, fuel permeability; injection flowability, and mold releasing properties. Moreover, the resin composition of Example 5 has a sufficiently low resistance by virtue of the conductive material.

The resin composition of Comparative Example 1 has poor fuel permeability due to the absence of semi-aromatic polyamide (B). The resin composition of Comparative Example 2 has poor injection flowability and mold releasability due to the excessively large content of the semi-aromatic polyamide (B). The resin composition of Comparative Example 3 has a low melting point, and poor injection flowability and mold releasability due to the absence of semi-aromatic polyamide (A) and semi-aromatic polyamide (B). The resin composition of Comparative Example 4 has small IZOD impact strength due to the absence of olefin polymer (C). The resin composition of Comparative Example 5 has poor injection flowability due to the olefin polymer (C) having a large content of the structural unit with a functional group.

INDUSTRIAL APPLICABILITY

The semi-aromatic polyamide resin composition of the present invention is excellent in impact resistance, fuel barrier properties, and moldability, and is particularly advantageous for molding a quick connector and the like.

The invention claimed is:

1. A semi-aromatic polyamide resin composition comprising: 20 to 60 parts by mass of a semi-aromatic polyamide (A') having a melting point (Tm) of 290° C. or higher and 340° C. or lower, measured with a differential scanning calorimeter (DSC), wherein the semi-aromatic polyamide (A') comprises as dicarboxylic acid components, a structural unit derived from terephthalic acid and a structural unit derived from adipic acid, and as a diamine component, a structural unit derived from a straight chain aliphatic group having 4 to 10 carbon atoms, and wherein 80 to 100 mol % of the diamine component contained in the semi-aromatic polyamide (A') is a structural unit derived from 1,6-hexanediamine; 5 to 30 parts by mass of a semi-aromatic polyamide (B) having a heat of melting of 0 J/g or more and 5 J/g or less in a temperature rising process of the differential scanning calorimeter (DSC); 1 to 30 parts by mass of an olefin polymer (C) comprising 0.1 to 1.5 parts by mass of a structural unit having a hetero atom-containing functional group; and 0 to 60 parts by mass of a fibrous filler (D); wherein total of (A'), (B), (C) and (D) is 100 parts by mass.

2. The semi-aromatic polyamide resin composition according to claim 1, wherein a molar ratio of the structural unit derived from terephthalic acid to the structural unit derived from adipic acid contained in the semi-aromatic polyamide (A') is 40/60 to 80/20.

3. The semi-aromatic polyamide resin composition according to claim 1, wherein the semi-aromatic polyamide (B) comprises as a dicarboxylic acid component, a structural unit derived from isophthalic acid, and as a diamine component, a structural unit derived from an aliphatic group having 4 to 15 carbon atoms.

4. The semi-aromatic polyamide resin composition according to claim 3, wherein the semi-aromatic polyamide (B) may further comprise a structural unit derived from terephthalic acid, and a molar ratio of the structural unit derived from isophthalic acid to the structural unit derived from terephthalic acid is 60/40 to 100/0.

5. The semi-aromatic polyamide resin composition according to claim 1, wherein the semi-aromatic polyamide (A') and the semi-aromatic polyamide (B) fulfills the relationship (B)/((A')+(B)) of 0.05 to 0.5, the (A') being the mass of the semi-aromatic polyamide (A'), and the (B) being the mass of the semi-aromatic polyamide (B).

6. The semi-aromatic polyamide resin composition according to claim 1, wherein 40 to 100 mol % of the diamine component contained, in the semi-aromatic polyamide (B) is a structural unit derived from 1,6-hexanediamine.

7. The semi-aromatic polyamide resin, composition according to claim 1, wherein the olefin polymer (C) comprises a skeleton derived from a polyolefin, and the skeleton is a copolymer of ethylene and an olefin having 3 or more carbon atoms.

8. The semi-aromatic polyamide resin composition according to claim 1, wherein:
the structural unit having a hetero atom-containing functional group of the olefin polymer (C) comprises a functional group selected from the group consisting of a carboxylic acid group, an ester group, an ether group, an aldehyde group, and a ketone group.

9. The semi-aromatic polyamide resin composition according to claim 1, wherein the structural unit having a hetero atom-containing functional group of the olefin polymer (C) is a structural unit modified by maleic anhydride.

10. The semi-aromatic polyamide resin composition according to claim 1, further comprising a conductive material (E).

11. The semi-aromatic polyamide resin composition according to claim 10, wherein the conductive material (E)

is at least one member selected from the group consisting of carbon fiber, conductive carbon black, carbon fibril and carbon nanotube.

12. A molded product comprising the semi-aromatic polyamide resin composition according to claim 1.

13. The molded product according to claim 12, for use as a quick connector.

* * * * *